United States Patent [19]
Fisher et al.

[11] Patent Number: 5,233,254
[45] Date of Patent: Aug. 3, 1993

[54] CONICAL ROTOR FOR SWITCHED RELUCTANCE MACHINE

[75] Inventors: Edward A. Fisher; Eike Richter, both of Cincinnati, Ohio

[73] Assignee: General Electric Company, Cincinnati, Ohio

[21] Appl. No.: 858,805

[22] Filed: Mar. 27, 1992

[51] Int. Cl.$^5$ .............................................. H02K 1/22
[52] U.S. Cl. ........................................ 310/261; 310/90; 310/185
[58] Field of Search ............... 310/261, 262, 264, 265, 310/267, 269, 90, 190, 191, 209, 254, 216, 255, 263, 185

[56] References Cited

U.S. PATENT DOCUMENTS

| | | |
|---|---|---|
| 1,039,197 | 9/1912 | Roth et al. |
| 2,694,781 | 11/1954 | Hinz ........................................ 310/261 |
| 3,356,425 | 12/1967 | Carriere ............................ 310/90.5 |
| 3,648,090 | 3/1972 | Voin ..................... 310/191 |
| 4,045,696 | 8/1977 | Lutz et al. ................. 310/49 |
| 4,117,359 | 9/1978 | Wehde ..................... 310/90 |
| 4,920,295 | 4/1990 | Holden et al. ...................... 310/209 |
| 5,036,235 | 7/1991 | Kleckner .................... 310/191 |

FOREIGN PATENT DOCUMENTS

| | | | |
|---|---|---|---|
| 1014638 | 8/1957 | Fed. Rep. of Germany | 310/209 |
| 1037570 | 8/1958 | Fed. Rep. of Germany | 310/209 |

*Primary Examiner*—R. Skudy
*Attorney, Agent, or Firm*—Bernard E. Shay; Jerome C. Squillaro

[57] ABSTRACT

The invention comprises a motor including a stator having stator teeth. The motor further includes a rotor having rotor teeth wherein the rotor is mounted on a shaft which is supported by a bearing. According to the present invention, the rotor is conically shaped such that the gap between the rotor and stator increases in proportion to the distance from the bearing.

5 Claims, 1 Drawing Sheet

CONICAL ROTOR FOR SWITCHED RELUCTANCE MACHINE

The U.S. Government has rights in this invention pursuant to contract no. F33615-90-C-2052 awarded by the United States Air Force.

The present invention relates, in general, to electric motors and, more particularly, to cantilevered electric motors including conical rotors.

BACKGROUND OF THE INVENTION

In electrical motors, the rotor normally includes a shaft which is supported at each end by bearings. The rotor itself may be formed on the shaft by, for example, pressing rotor laminations over the shaft to build up a suitable rotor. In switched reluctance machines, the rotor does not include wire coils as torque is generated by changing reluctance between the rotor and stator poles.

In certain switched reluctance machines, it may be desirable to eliminate one of the rotor bearings. In such a machine, the rotor shaft is mounted on a single bearing in a cantilever arrangement. In motors with a cantilevered rotor shaft, vibrations in the shaft are transmitted to the rotor. Vibrations in the rotor result in undesirable changes in the rotor-stator air gap and may, under certain conditions result in contact between the rotor and stator. It would, therefore, be advantageous to design a cantilevered rotor wherein the rotor would not, under normal operation conditions, contact the stator.

The present invention applies to any rotating electrical machine in which a rotor must be suspended from a single bearing, including electrical machines where the bearing is external to the machine. More particularly, the present invention is applicable to an electrical starter generator which is designed to be integrally mounted on the core engine rotor shaft in front of an engine bearing of a gas turbine engine.

Currently, all electrical machines are designed with a fixed rotor-to-stator air gap. The gap is minimized to achieve good machine efficiency, while avoiding interference between the rotor and stator. The gap is customarily sized to accommodate the displacement of the most severe vibrational mode.

SUMMARY OF THE INVENTION

The invention comprises a motor including a stator having stator teeth. The motor further includes a rotor having rotor teeth wherein the rotor is mounted on a shaft which is supported by a bearing. According to the present invention, the rotor is shaped such that the gap between the rotor and stator increases in proportion to the distance from the bearing. More particularly, the rotor is conically shaped.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Figure 1:
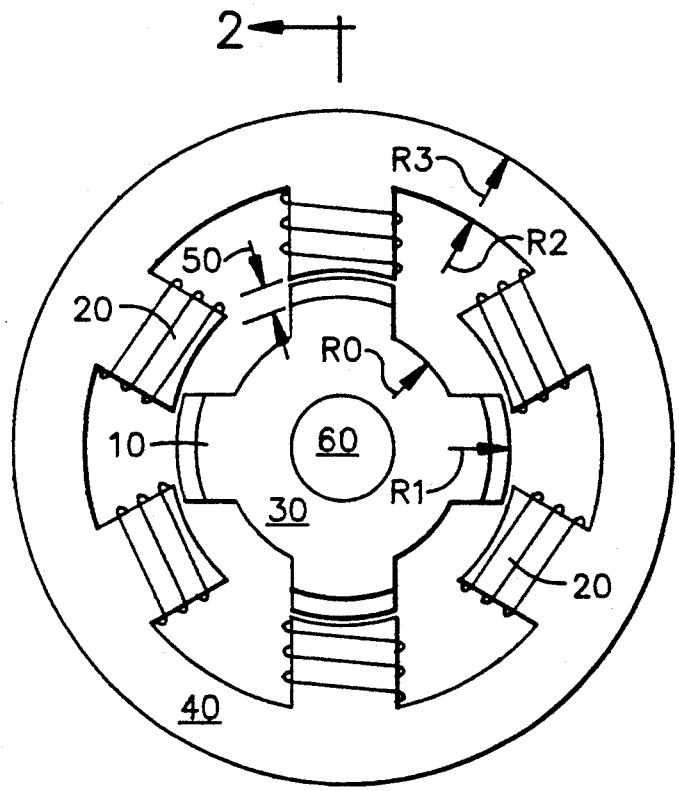
FIG. 1 is an end view of a motor according to the present invention.

In FIG. 1, a motor comprising a stator 40 including stator teeth 20 surrounding a rotor 30 including rotor teeth 10. R0 is the rotor outer radius. R1 is the outer radius of the rotor teeth. Rotor 30 is attached to a shaft 60. The gap 50 between the rotor teeth 10 and stator teeth 20 increases along the rotor axis.

Figure 2:
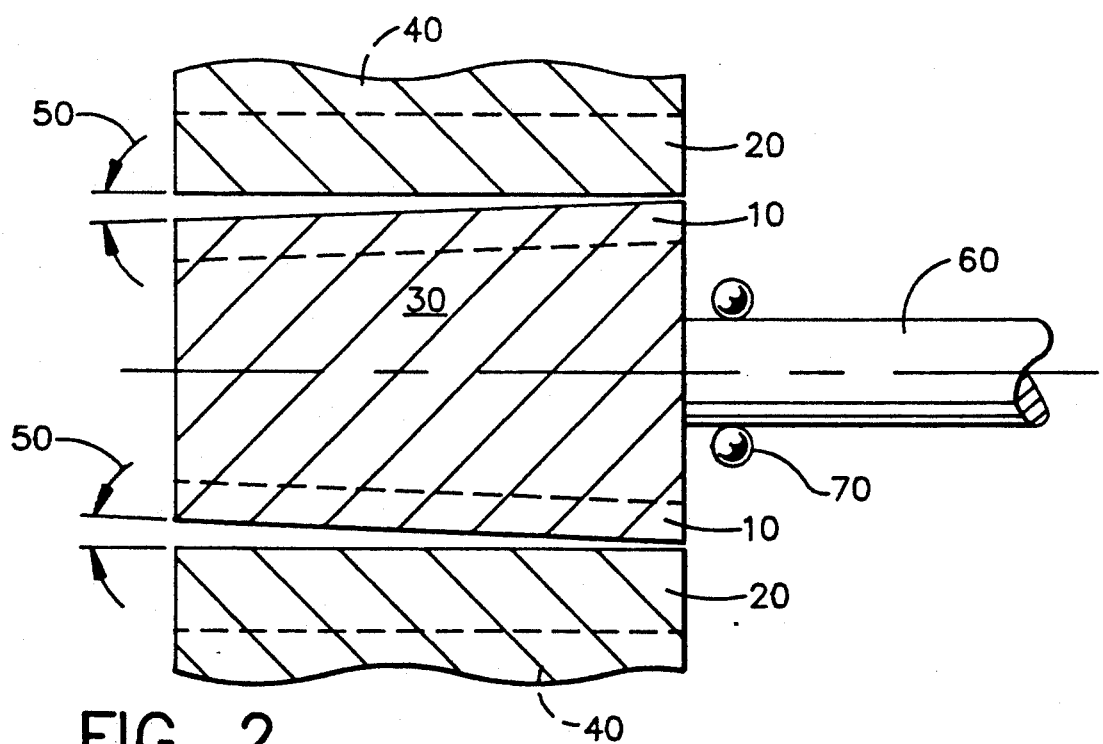
FIG. 2 is a cutaway side view of a motor according to the present invention.

FIG. 2 is a cut away view of the motor illustrated in FIG. 1, along line 2—2. In FIG. 2, rotor 30 is supported on shaft 60 which is supported in a cantilever arrangement by bearing 70. Stator 40 may be mounted on a structure which is independent of rotor 30 such that it may vibrate with respect to rotor 30. Gap 50 in FIG. 2 represents the air gap between stator teeth 20 and rotor teeth 10. Gap 50 increases along the axis of rotor 30 as the distance from bearing 70 increases.

In a switched reluctance machine according to this present invention, rotor 30 would ordinarily comprise a series of laminations pressed onto shaft 60. The laminations would be press fitted onto shaft 60 such that rotor teeth 10 are aligned along the axis of shaft 60. In the present invention, the lamination with the greatest diameter would be pressed onto shaft 60 close to bearing 70. Subsequent rotor laminations of increasingly smaller diameter would be pressed onto shaft 60 to form rotor 30.

Gap 50, according to the present invention, must be designed to ensure that radial motion of the rotor will not result in contact between the rotor and the stator under the most demanding vibrational circumstances, while being designed to minimize the average rotor to stator distance in order to increase the efficiency of the electrical machine.

The diameter of laminations which form rotor 30 would be selected according to the gap desired at any point along shaft 60. The gap 50 may be determined by calculating the maximum vibration expected in shaft 60, and multiplying the maximum vibration amplitude by the distance between bearing 70 and the lamination to determine the gap width necessary to prevent interference between rotor teeth 10 and stator teeth 20.

It will be apparent to those skilled in the art that the shape and width of the gap will be a function of the characteristics of the switched reluctance machine, including the stator and the rotor, and the vibrational characteristics of the mounting structure (e.g., an aircraft engine). A first application of the characteristics of the rotor may be obtained by modeling the rotor as a beam flexing in a vibrational mode. Alternatively, a better analysis may be obtained using a detailed dynamic model.

It will be apparent to those of skill in the art that rotor 30 may be constructed conventionally, that is with a round cross section, while stator 40 is shaped to ensure that airgap 50 increases along the axis of the machine away from bearing 70. Further, any combination of rotor and stator shapes wherein the rotor-shaft gap increases along an axis of the rotor may be used to implement the invention.

The rotor need not be purely conical along its length. The diameters of the rotor laminations may be periodically stepped in order to reduce production costs. In very large machines the conical rotor surface may be curved to accommodate flexing of the rotor shaft.

According to one embodiment of this invention, shaft 60 may be the core rotor shaft of a gas turbine engine. In this embodiment, bearing 70 may be a main engine bearing while stator 40 is fixed to the engine frame. Rotor 30 may be constructed of switched reluctance laminations pressured over shaft 60. In some embodiments of the present invention, gap 50 may be stepped rather than continuous.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

What we claim is:

1. An electrical machine comprising:
   a stator including stator teeth;
   a conically shaped rotor including rotor teeth;
   a shaft being attached to said rotor and being supported by a bearing; and
   a gap between said stator teeth and said rotor teeth wherein said gap increases along an axis of said rotor.

2. An electrical machine according to claim 1 wherein:
   said gap increases along said shaft as a distance to said bearing increases.

3. An electrical machine comprising:
   a stator including stator teeth;
   a rotor including rotor teeth wherein said rotor includes a shaft end and a free end, said rotor being mounted on a shaft which extends out said shaft end;
   a gap between said rotor teeth and said stator teeth wherein said gap is greater near said free end than near said shaft end.

4. An electrical machine according to claim 3 wherein:
   said shaft is mounted in a bearing positioned near said shaft end of said rotor.

5. An electrical machine according to claim 4 wherein:
   said rotor is conically shaped.

* * * * *